US006826513B1

(12) United States Patent
Kumar et al.

(10) Patent No.: US 6,826,513 B1
(45) Date of Patent: Nov. 30, 2004

(54) METHOD AND APPARATUS FOR ONLINE IDENTIFICATION OF SAFE OPERATION AND ADVANCE DETECTION OF UNSAFE OPERATION OF A SYSTEM OR PROCESS

(75) Inventors: Viruthiamparambath Ravi Kumar, Pune (IN); Bhaskar Dattatraya Kulkarni, Pune (IN); Anandamohan Ghosh, Pune (IN)

(73) Assignee: Council of Scientific & Industrial Research, New Delhi (IN)

(*) Notice: Subject to any disclaimer, the term of this patent is extended or adjusted under 35 U.S.C. 154(b) by 0 days.

(21) Appl. No.: 10/639,475

(22) Filed: Aug. 13, 2003

Related U.S. Application Data

(63) Continuation of application No. 10/305,977, filed on Nov. 29, 2002, now abandoned.

(51) Int. Cl.[7] .............................................. G06F 15/00
(52) U.S. Cl. ....................... 702/185; 702/182; 702/183; 702/184; 702/189; 702/190
(58) Field of Search ................... 702/32–35, 56, 702/57, 66–79, 81, 104, 105, 122, 124, 126, 179, 180, 182–185, 189, 190, 191, 194–198, FOR 103–FOR 104, FOR 107–FOR 110, FOR 164, FOR 166, FOR 168, FOR 176–171; 714/11, 12, 15, 798, 799, 819; 340/3.42, 3.43, 3.44; 700/9–12, 214, 79, 83

(56) References Cited

U.S. PATENT DOCUMENTS

| | | | | |
|---|---|---|---|---|
| 4,060,716 A | * | 11/1977 | Pekrul et al. ................ | 702/184 |
| 6,041,287 A | * | 3/2000 | Dister et al. ................. | 702/182 |
| 6,208,951 B1 | * | 3/2001 | Kumar et al. ............... | 702/191 |
| 6,330,525 B1 | * | 12/2001 | Hays et al. .................. | 702/183 |
| 6,654,697 B1 | * | 11/2003 | Eryurek et al. .............. | 702/47 |
| 2003/0204398 A1 | * | 10/2003 | Haverinen et al. .......... | 704/233 |
| 2004/0024568 A1 | * | 2/2004 | Eryurek et al. ............. | 702/182 |
| 2004/0059496 A1 | * | 3/2004 | Pursifull et al. ............ | 701/114 |

OTHER PUBLICATIONS

Press et al., William H. "Numerical Receipes in Fortran", The Art of Scientific Computing, Second Edition.
Strang et al., Gilbert "Wavelets and Filter Banks", Wellesley–Cambridge Press, 514.512.2 STR.
Vetterli, et al., Martin, "Wavelets and Subband Coding", Princeton Hall PTR 681.3, 1.5.
Percival et al., Donald B., "Wavelet Methods for Time Series Analysis", Cambridge University Press.
Morbidelli et al., Massimo, "Parametric Sensitivity and Runaway in Fixed–Bed Catalytic Reactions", Department of Chemical Engineering.
Van Welsenaere et al., R.J. "Parametric Sensitivity and Runaway in Fixed–Bed Catalytic Reactors", Chemical Engineering Science.
Rajadhyaksha et al., R.A.., "Parametric Sensitivity in Fixed–Bed Reactors", Chemical Engineering Science.
Broomhead et al., D.S., "Extracting Qualitative Dynamics From Experimental Data", Physics.

* cited by examiner

*Primary Examiner*—Marc S. Hoff
*Assistant Examiner*—Carol S W Tsai
(74) *Attorney, Agent, or Firm*—Sughrue Mion, PLLC

(57) ABSTRACT

A method and apparatus for online identification of safe operation and advance detection of unsafe operation of systems or processes from signals containing noise wherein the method and apparatus uses wavelet transformations to accurately infer from criteria about the changes in the monitored process variables and its acceleration as a basis for advance detection of unsafe operation, the said process of online identification of safe operation and advance detection of unsafe operation has applications in a wide variety of situations where digitized data could be made available.

28 Claims, 7 Drawing Sheets

(a)

(b)

(c)

(d)

METHOD AND APPARATUS FOR ONLINE IDENTIFICATION OF SAFE OPERATION AND ADVANCE DETECTION OF UNSAFE OPERATION OF A SYSTEM OR PROCESS

This is a continuation of Application No. 10/305,977 filed Nov. 29, 2002 now abandoned; the disclosure of which is incorporated herein by reference.

FIELD OF THE INVENTION

The present invention relates to a method and an apparatus for online detection of safe operation and advance detection of unsafe operation of a system or process in the presence of noise in sensor measurements and/or fluctuations in variables measured. More particularly, the present invention provides a method and an apparatus capable of providing advance warnings of a system or process becoming unsafe during operation. Still more particularly, the present invention relates to a method and an apparatus that uses complex/noisy sensor measurements made available from sensors which monitor temperature, viscosity, thermal conductivity, chemical species concentrations, pressure or flow signals as a time-series from a batch, continuous stirred tank, fixed-bed, biochemical, polymerization, fluidized-bed, catalytic/noncatalytic reactors, multiphase, flow or other physical systems operating under varied conditions for advance online identification of normal/safe operation along with detection of abnormal/unsafe operation.

BACKGROUND OF THE INVENTION PRIOR ART REFERENCES

Detection and advance warning of unsafe operation of a system in presence of commonly encountered measurement noise causing fluctuations in monitored sensor signals of either temperature, viscosity, thermal conductivity, mass diffusivity, chemical species concentrations, pressure or flow as time-series from batch, continuous stirred tank, fixed-bed, biochemical, polymerization, fluidized-bed, catalytic/noncatalytic reactors, multiphase, flow or other physical systems is of great importance in process applications. Online identification of normal safe process operation and detection of abnormal unsafe process operation in the presence of measurement noise from monitored digital sequences monitored from sensor apparatus as a time-series still evades satisfactory solution, despite efforts made over the years. The problem is particularly important in the context of chemical reactors where small changes in operating conditions can lead to unsafe process operating conditions resulting in risk to personnel safety, infrastructure, environment and process economics. It is important, therefore, to detect in advance the conditions when the system is initiated into an unsafe operating mode by an automated online procedure that uses time-series measurements that monitor process variable behavior. It is also important that this identification of safe process operation and advance detection of unsafe process operation be obtained when the fluctuations in the monitored signals arise due to process complexities on real time basis so that corrective actions can be taken to avoid the loss to life, property, environment, economics well in advance.

Unsafe process operating conditions in reactors arise when a small change in an operating variable like feed or coolant temperature, flow rate, concentrations of species, viscosity, thermal conductivity, mass diffusivity bring about a drastic change in variable values whereby the system becomes uncontrollable. For example, in the case of temperature, a small increase can induce a large increase in the reaction rates due to the exponential dependency of rate constants on temperature. The increased reaction rates further increases the temperature and this results in the process having the rate of heat generation far exceeding the rate of heat removal by the cooling equipment. Unsafe process operating conditions can damage the reactor vessel, can cause personnel risks, catalyst deactivation, choking, hotspot formation, environmental degradation, economic loss and it is important to a priori detect in advance the conditions which lead to this undesirable behavior so that they may be avoided. Studies related to the safety of process operation may be generally classified in two categories, viz., offline and online.

Offline methods analyze mathematical models of the reactor behavior for specifically chosen reaction systems with the aim of demarcating safe and unsafe regions of operation with respect to the values of the reactor control parameters (Van Welsenaere, R. J. and Froment, G. F., "Parametric Sensitivity and Runaway in Fixed-bed Catalytic Reactors", Vol. 25 Chem. Engg. Sci. 1503 [1970]; Rajadhyaksha, R. A., Vasudeva, K. and Doraiswamy, L. K., "Parametric Sensitivity in Fixed-bed Reactors", Vol. 30 Chem. Engg. Sci. 1399 [1975]; Morbidelli, M. and Varma, A., "Parametric Sensitivity and Runaway in Fixed-bed Catalytic Reactors", Vol. 41 No. 4 Chem. Engg. Sci. 1063 [1986]; Balakotaiah, V., Kodra, D. and Nguyen, D., "Runaway Limits for Homogeneous and Catalytic Reactors", Vol. 50 No. 7 Chem. Engg. Sci. 1149 [1995]; Heiszwolf, J. J., "Thermal Stability of Reacting Systems in Batch and Continuous Stirred Tank Reactors", Ph. D. Thesis, University of Amsterdam [1998]). Generally, offline methods study the steady-state behavior and not the dynamic behavior to predict safe conditions for process operation. The safe and unsafe regions in relevant process parameters are marked on ready-made charts and tables for look-up. Because the mathematical model of the system is used in offline methods the criteria that are developed to test the safety have a serious drawback in the sense that they are conservative and do not apply in a generalized fashion. This is especially true for complex systems which are commonly encountered in many chemical, catalytic, polymerization, combustion, cracking, multiphase, flow and other physical systems.

On the other hand, few attempts have been made in developing online criteria using time-series signals from processes for the identification of safe operation and detection of unsafe operating conditions (Hub, L. and Jones, J. D., "Early Online Detection of Exothermic Reactions", Vol. 5 Plant/Oper. Prog. 221 [1986]). Thus for instance, for exothermic reactions taking place in a reactor, temperature measurements by thermocouples, thermometers, thermistors, are usually available as monitored data of the temperature variable in time. The first derivative and higher-order derivatives of this monitored process variable turning positive are a signature of unsafe operation. But, a very significant drawback of these methods is that computation of derivatives is error-prone because of the commonly encountered fluctuating nature of the measurements especially when the measurement is noisy or the process is associated with fast time scales. Thus, the frequency of monitoring and the sample size used for calculation can have significant bearing on detecting unsafe conditions (Iserman, R., "Process Fault Detection Based on Modeling and Estimation Methods—A Survey", Vol. 20 Automatica 387 [1984]). A possible way is to calculate derivatives by processing the signal with filters. Linear filters when applied to signals obtained from processes following nonlinear mechanisms is again error-prone because the true signal content may be inadvertently filtered. In principle, however, online methodologies have the advantage that they have generalization capability because the methods are applicable even when the mechanistic nature of the process or its mathematical model is unknown. Developing rigorous online methods when adequate modeling information is not known, but, takes into consideration the nonlinear properties of the process implicitly embedded in the data is important. Moreover, these methods would be most useful if they can also handle the presence of measurement noise while analyzing for safety. The advantages of developing online methods and apparatus for these aims would identify conditions when unsafe operation alarms are triggered so that other corrective measures are implemented on the process. On the other hand, as much as detection of unsafe conditions is important, the reverse situation of false alarms being raised is also deleterious to process operation and must be avoided as it affects process economics due to unnecessary shutdowns. Robustness in the method and apparatus for detection of unsafe operation would also imply realizing this objective.

A number of methods, have been studied, in the context of time-series analysis to effectively reduce the noise component in the data arising due to sensor measurement errors or due to fluctuating nature of the process variables. The methods obtain noise reduction by smoothening structures present in the data by FIR and IIR filters based on fast Fourier transform, kernel, and spline estimators (King, R. and Gilles, E. D., "Multiple Filter Methods for Detection of Hazardous States in an Industrial Plant", Vol. 36 AlChE Journal 1697 [1990]; Abarbanel, H. D. I., "The Observance of Chaotic Data in Physical Systems"; Vol. 65 Rev. Mod. Phys. 1340 [1993]; Cohen, L., "Time-Frequency Analysis", Prentice Hall, New Jersey [1995]; Kantz, H. and Schreiber, T., "Nonlinear Time Series Analysis", Cambridge University Press [1997]). However, these methods assume that the noise is dominant in higher frequencies. This assumption is crude and inaccurate for large classes of complex signals. Singular value decomposition techniques and other methods that construct local linear maps, to take care of the nonlinearity have also been developed (Broomhead, D. S. and King, G. P., "Extracting Qualitative Data from Experimental Data", Vol. 20 Physica D 217 [1986]; Albano, A. M., Muench, J., Schwartz, C., Mees, A. I. and Rapp, P. E., "Singular Value Decomposition and Grassberger-Procaccia Algorithm", Vol. 38 Phys. Rev. A 3017 [1988]). These methods attempt to reconstruct the phase-space and project the original time-series on a subspace spanning the largest fraction of the total variance in the data. However, the method is difficult to apply in a straightforward fashion because of the complex and intricate choices that have to be made and understood for implementation.

Recently, Zaldivar et al U.S. Pat. No 6,195,010 [2001] and Strozzi, F., Zaldivar, J. M., Kronberg, A. E. and Westerterp, K. R., "On-line Runaway Detection in Batch Reactors Using Chaos Theory Techniques", Vol. 45 No. 11 AIChE Journal 2429 [1999] have addressed the problem of detecting unsafe operating conditions online by taking into account the intrinsic nonlinearity of the process by estimating divergences of monitored temperature profiles using nonlinear techniques of analysis borrowed from chaos theory. The method is rigorous because it involves phase-space reconstruction using the time-series data by time-delay embedding. The application of this technique, however, involves a-priori knowledge of the time-delay and the embedding dimension as parameters. These parameters when inappropriately selected can lead to wrong estimates of the divergences. Another drawback of this methodology is that the reconstruction of the phase-space and estimation of the divergences is not robust when noise is present in the monitored signals (Strozzi et al, [1999]). It is, therefore, necessary to develop alternate methods that can identify safe process operation and detect unsafe operating conditions when both nonlinearity and noise are present in the measured signals.

Yet another method that has been developed recently, for noise reduction from nonlinear time series data employs wavelet transform which is a generalization of the Fourier transform. The wavelet transform has the advantage of removing the major drawback of Fourier transform, namely, non-resolution of local information in time. Thus when a distinct catastrophic event occurs in a process, Fourier transform analysis in the frequency domain cannot detect the occurrence of this event. Wavelet transforms, on the other hand, can capture the occurrence of the catastrophic event by combining the frequency analysis properties of Fourier transform with inferences possible due to the time localization property of the wavelet transform. It may be appreciated that catastrophic events like onset of unsafe process operation is localized in time and it would be advantageous to use wavelet transform methodologies to detect the occurrence of this condition provided an efficient method is used simultaneously for noise reduction. Hitherto, the Inventors bring out a new method using wavelet transforms, which in an automated way detects in advance unsafe process operation by simultaneously reducing the noise component in the data.

Wavelet transforms have been employed in studying nonlinear, multiscale and nonstationary processes in various interdisciplinary fields (Vetterli, M. and Kovacevic, J., "Wavelets and Subband Coding", Prentice Hall, New Jersey [1995]). General methodologies for multiresolution signal processing and multigrid techniques have led to applications in spectroscopy, quantum mechanics, turbulent flows, data compression, image and speech processing (Percival, D. B. and Walden, A. T., "Wavelet Methods for Time Series Analysis", Cambridge University Press [2000]). Wavelet transform methods have therefore been increasingly used as tools for studying multiscale, nonstationary and nonlinear processes in various fields. Wavelets are derived from rapidly oscillating functions with mean zero and obtained by scaling of analyzing function to match the desired frequencies with simultaneous translations in time. A wide variety of analyzing functions amenable for discrete and continuous time analysis is known (Strang, G. and Nguyen, T., "Wavelets and Filter Banks", Cambridge Press, Wellesley [1996]; Holschneider, M., "Wavelets and Analysis Tool", Clarendon Press, Oxford [1995]). Typical wavelet examples are discrete Haar, Daubechies, spanning a wide range of discrete and continuous properties including compact support, bi-orthogonal, spline, Battle-Lemarie, etc. Concisely stated wavelet transforms takes the inner product of a set of above basis wavelets with the available process data $\theta$. Repeated applications for various scales a of the basis wavelet function for translations in time b yields scale (i.e., related to frequency) and time inferences to be made from the scalogram (a matrix W of wavelet coefficients w). Analysis of coefficients in the matrix W can be used make conclusions about the time-scale behavior of the process. Alternatively, changing the values of W in a rational way can bring out the true process properties in time and can lead to accurate inferences been drawn regarding the safety aspects of process operation.

In particular, wavelet transforms have been used to create methodologies in reducing noise from signals monitored from a process. The wavelet transform methods for detection of signals in composite signals containing noise are mainly based on the concept of thresholding the wavelet coefficients obtained by a single transformation. Thus, the application of wavelet transform in reducing speckle noise has been described in U.S. Pat. No. 5,497,777 [1996] and in a continuing U.S. Pat. No. 5,619,998 [1997] where a coherent imaging system signal is reduced of speckle noise by nonlinear adaptive thresholding of wavelet coefficients. The resulting image was seen to have an improved signal to noise ratio. The method is independently applied to wavelet scales obtained by a single wavelet transform on a data in a subinterval. However, it would be beneficial to have a process by means of which noise at each scale is considered on a relative basis.

Yet another method for using wavelet transform hard thresholds by setting to zero all wavelet coefficients below a certain threshold at all scales for denoising. In contrast, soft thresholding methods reduce all coefficients at various scales by a threshold value. In both cases the threshold value is determined by statistical calculations and is dependent on the standard deviation of noise and the number of data points. The specified threshold value may be used to evaluate entropy properties and other cost functions to generate a basis that can be used to validate the results of noise reduction. However, the method is dependent on a priori knowledge of the characteristics of the standard deviation of noise in the signal and therefore its applicability to short data length. This is not easily applicable when the signal is nonstationary and the properties of the noise vary. Therefore, considerable improvements in the methods are still needed for accuracy when applying these wavelet transform methods in many precision applications like chemical process plants, complex fluid dynamical flows, medical diagnostics, image analysis, etc. The central problem here is that noise can be present in all frequencies and eliminating components based on statistical thresholding is not sufficient. To find alternatives that address and alleviate these difficulties, new methods utilizing wavelet transform in alternate settings, for denoising process data need to be developed.

Newer methods for the identification and/or separation of composite signals into its deterministic and noisy components without the need for threshold values to be calculated and whose basis has a principled scientific rationale have been recently made. Recognizing that noise can be present at all scales, the principle used for separation between deterministic signal components and noise in a composite signal is that the relative power distribution (RPD) will remain constant for noise at different scales, while that, for the deterministic component RPD will vary, (U.S. Pat. No. 6,208,951 [2001]). Different ways of achieving this separation of noise from the deterministic component is possible. One way is to employ recursive wavelet transforms on a composite signal till the RPD at different scales show constancy. Recursively transformed scales contain information about the local noise content in the original composite signal. Separation of the deterministic components from the noisy signal is therefore possible. Yet another method of separating the deterministic and noise components would be to differentiate the data and carry out the process of wavelet transform on the differentiated data (Roy, M., Ravi Kumar, V., Kulkarni, B. D., Sanderson, J., Rhodes, M. and vander Stappen, M., "Simple Denoising Algorithm Using Wavelet Transform", Vol. 45 No. 11 AIChE Journal 2461 [1999]). Upon differentiation the contributions due to noise moves towards the finer wavelet scales because the process of differentiation converts the uncorrected stochastic process to a first-order moving average process and thereby distributes more of its energy in the finer wavelet scales (i.e., in the high frequency wavelet scales expressed in dyadic format). Therefore, the properties of noise with respect to differentiation can be fruitfully utilized by eliminating those scales contributing to the noise before carrying out inverse wavelet transform. It should be stated that the effectiveness of separation depends on the chosen wavelet basis function. In view of the fact that orthogonal bases yield loss-less wavelet transform of data, its choice would be preferred. It is to be brought out that the methods discussed above do not involve the direct consideration of the properties of noise in the composite signal (composed of true deterministic signal and noise). Placing the noise component in wavelet scales distinct from those of the deterministic component brings about the noise reduction.

Thus, online identification of normal safe process operation and detection of abnormal unsafe process operation in the presence of measurement noise from monitored digital sequences monitored from sensor apparatus as a time-series still evades satisfactory solution, despite efforts made over the years.

SUMMARY OF THE INVENTION

Accordingly the present invention has provided a method and an apparatus for online identification of safe operation and advance detection of unsafe operation of a system or a process which is useful and advantageous method and can be applied in a systematic and rational manner using wavelet transforms for denoising with online criteria related to safe process operation. Particularly, the present invention discloses a systematic and improved method for identification of safe process operation and advance detection of unsafe process operation, even when the monitored signals of process variables from the process are noisy, and which allows for inferring effects of changes in process states and operating conditions to be reliably inferred from the monitored process data. The method is robust and is based on scientific rationale and can be used for signals obtained online by sensors monitoring the changes in the process variable(s) as measurements and suitably digitized to rescaled time-series data by analog to digital (A/D) apparatus. Inferences regarding safety in process operation can be made accurately and quickly and is applicable to situations independent of the phenomenological description of the process, of the availability of mathematical models and does not use per-se the operating process parameter values in making the inferences about safe and unsafe process operation.

OBJECTS OF THE INVENTION

The main object of the present invention is to provide an improved method for the online identification of safe operation and advance detection of unsafe operation of a system or process.

Another object of the invention is to show that the identification of safe operation and detection of unsafe operating condition can be incorporated effectively in an apparatus monitoring process signals.

Yet another object of the invention is to show that the identification of safe operation and detection of unsafe operating condition can be made in real-time by incorporating the modifications to the monitoring apparatus.

Still another object of the present invention is to provide an apparatus for online identification of safe operation and advance detection of unsafe operation of a system or process that can lead to better and accurate inferences about process behavior.

One more object of the present invention is to bring out that a combination of the above objects in a systematic manner provides a new general framework for the online identification of safe operation and advance detection of unsafe operation of systems or processes.

DESCRIPTION OF DRAWINGS

FIG. 3(a) shows the resealed measurements of the process temperature $\theta(i)$ as reaction proceeds in time index i. FIG. 3(b) shows the computed fluctuating online first derivative data $\theta^{(1)}(i)$ from process variable measurements. The fluctuations are due to the noise present in the measured data $\theta(i)$. FIG. 3(c) presents the denoised first derivative data $\theta_d^{(1)}(i)$ obtained by denoising $\theta^{(1)}(i)$ using wavelet transform. The inset shows that the power in the wavelet scales 0, . . . ,7 indicating a minima at m=j=4. FIG. 3(d) presents the online denoised second derivative data $\theta_d^{(2)}(i)$ computed from $\theta_d^{(1)}(i)$ using wavelet transform. The inset shows that the power in the wavelet scales 0, . . . ,7 indicating a minima at m'=j=4.

FIG. 4(a) represents a graph between noisy rescaled temperature data $\theta(i)$ and time index i for $\alpha=A=6.0$. It can be seen from the graph that the noisy rescaled temperature data $\theta(i)$ increases rapidly beyond i=1100. It can also be noticed that the denoised first derivative data $\theta_d^{(1)}(i)$ (represented by thin continuous line) and the denoised second derivative data $\theta_d^{(1)}(i)$ (thick continuous line) for control parameter value $\alpha=A$, become positive for $i \geq 1100$. Thus the unsafe operating condition is detected in advance at i=1100. FIG. 4(b) represents a graph between the noisy rescaled temperature data $\theta(i)$ and time index i for $\alpha=A'=26.0$. It can be seen from the graph that the noisy rescaled temperature data $\theta(i)$ first shows an increase followed by a decrease w.r.t. time index i. It can also be noticed that the denoised first derivative data $\theta_d^{(1)}(i)$ (thin continuous line) and the denoised second derivative data $\theta d^{(1)}(i)$ (thick continuous line) for control parameter value $\alpha$ equal to A', do not simultaneously show positivity and hence do not satisfy the criteria of unsafe operation. Thus, it can be seen that the method accurately identifies the reactor to be operating safely. FIG. 4(c) represents the power profile $\ln(P_8^{(2)})$ for scale j=8>m'=4. The graph indicates positive power for $\alpha=A$ (thick continuous line) and satisfies Equation 7c confirming the advance detection of unsafe operation. The corresponding power profile for $\alpha=A'$ (thin continuous line) shows negative power and does not satisfy Equation 7c thus confirming the operation to be safe. FIG. 4(d) reconfirms the findings of FIG. 4(c) using the power profile $\ln(P_7^{(2)})$ for scale j=7>m'=4 which shows positive power for $\alpha=A$ (thick continuous line) while the corresponding power profile for $\alpha=A'$ (thin continuous line) shows negative power.

FIG. 5(a) represents a graph between noisy resealed temperature data $\theta(i)$ and time index i for $\alpha=A=14.0$. It can be seen from the graph that the noisy rescaled temperature data $\theta(i)$ increases rapidly beyond i=925. It can also be noticed that the denoised first derivative data $\theta_d^{(1)}(i)$ (represented by thin continuous line) and the denoised second derivative data $\theta_d^{(1)}(i)$ (thick continuous line) for control parameter value $\alpha$ equal to A, become positive for $i \geq 925$. Thus the unsafe operating condition is detected in advance at i=925. FIG. 5(b) represents a graph between the noisy resealed temperature data $\theta(i)$ and time index i for $\alpha=A'=20.0$. It can be seen from the graph that the noisy resealed temperature data $\theta(i)$ first shows an increase followed by a decrease w.r.t. time index i. It can also be noticed that the denoised first derivative data $\theta_d^{(1)}(i)$ (thin continuous line) and the denoised second derivative data $\theta_d^{(1)}(i)$ (thick continuous line) for control parameter value $\alpha$ equal to A', do not simultaneously show positivity and hence do not satisfy the criteria of unsafe operation. Thus, it can be seen that the method accurately identifies the rector to be operating safely. FIG. 5(c) represents the power profile $\ln(P_8^{(2)})$ for scale j=8>m'=4. The graph indicates positive power for $\alpha=A$ (thick continuous line) and satisfies Equation 7c confirming the advance detection of unsafe operating conditions. The corresponding power profile for $\alpha=A'$ (thin continuous line) shows negative power and does not satisfy Equation 7c thus confirming the reactor to be operating safely. FIG. 5(d) reconfirms the findings of FIG. 5(c) using the power profile $\ln(P_7^{(2)})$ for scale j=7>m'=4 which shows positive power for $\alpha=A$ (thick continuous line) while the corresponding power profile for $\alpha=A'$ (thin continuous line) shows negative power.

FIG. 6(a) represents a graph between noisy resealed temperature data $\theta(i)$ and time index i for $\alpha=A=5.0$. It can be seen from the graph that the noisy resealed temperature data $\theta(i)$ increases rapidly beyond i=1875. It can also be noticed that the denoised first derivative data $\theta_d^{(1)}(i)$ (represented by thin continuous line) and the denoised second derivative data $\theta_d^{(1)}(i)$ (thick continuous line) for control parameter value $\alpha=A$, become positive for $i \geq 1875$. Thus the unsafe operating condition is detected in advance at i=1875. FIG. 6(b) represents a graph between the noisy rescaled temperature data $\theta(i)$ and time index i for $\alpha=A'=14.0$. It can be seen from the graph that the noisy rescaled temperature data $\theta(i)$ first shows an increase followed by a decrease w.r.t. time index i. It can also be noticed that the denoised first derivative data $\theta_d^{(1)}(i)$ (thin continuous line) and the denoised second derivative data $\theta_d^{(1)}(i)$ (thick continuous line) for control parameter value $\alpha$ equal to A', do not simultaneously show positivity and hence do not satisfy the criteria of unsafe operation. Thus, it can be seen that the method accurately identifies the reactor to be operating safely. FIG. 6(c) represents the power profile $\ln(P_8^{(2)})$ for scale j=8>m'=4 The graph indicates positive power for α=A (thick continuous line) and satisfies Equation 7c confirming the advance detection of unsafe operating conditions. The corresponding power profile for α=A' (thin continuous line) shows negative power and does not satisfy Equation 7c thus confirming the rector to be operating safely. FIG. 6(d) reconfirms the findings of FIG. 6(c) using the power profile $\ln(P_7^{(2)})$ for scale j=7>m'=4 which shows positive power for α=A (thick continuous line) while the corresponding power profile for α=A' (thin continuous line) shows negative power.

FIG. 7(a) represents a graph between noisy rescaled temperature data θ(i) and time index i for α=A=9.0. It can be seen from the graph that the noisy resealed temperature data θ(i) increases rapidly beyond i=4500. It can also be noticed that the denoised first derivative data $\theta_d^{(1)}(i)$ (represented by thin continuous line) and the denoised second derivative data $\theta_d^{(1)}(i)$ (thick continuous line) for control parameter value α=A, become positive for i≧4500. Thus the unsafe operating condition is detected in advance at i=4500. FIG. 7(b) represents a graph between noisy rescaled temperature data θ(i) and time index i for α=A'=20.0. It can be seen from the graph that the noisy rescaled temperature data θ(i) first shows an increase followed by a decrease w.r.t. time index i. It can also be noticed that the denoised first derivative data $\theta_d^{(1)}(i)$ (thin continuous line) and the denoised second derivative data $\theta_d^{(1)}(i)$ (thick continuous line) for control parameter value α equal to A', do not simultaneously show positivity and hence do not satisfy the criteria of unsafe operation. Thus, it can be seen that the method accurately identifies the reactor to be operating safely. FIG. 7(c) represents the power profile $\ln(P_9^{(2)})$ for scale j=9>m'=4. The graph indicates positive power for α=A (thick continuous line) and satisfies Equation 7c confirming the advance detection of unsafe operating conditions. The corresponding power profile for α=A' (thin continuous line) shows negative power and does not satisfy Equation 7c thus confirming the reactor to be operating safely. FIG. 4(d) reconfirms the findings of FIG. 4(c) using the power profile $\ln(P_8^{(2)})$ for scale j=8>m'=4 which shows positive power for α=A (thick continuous line) while the corresponding power profile for α=A' (thin continuous line) shows negative power.

DETAILED DESCRIPTION OF THE INVENTION

Figure 1:
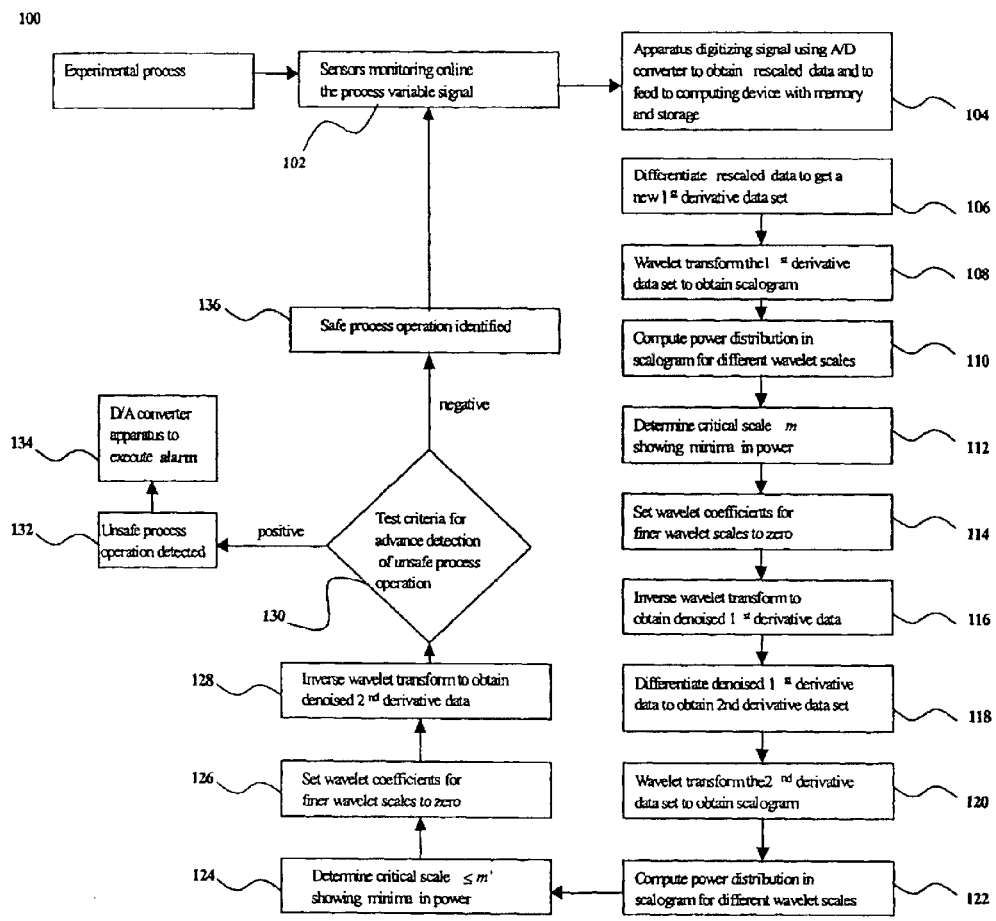
FIG. 1 shows the block diagram of the apparatus for identification of safe operation and advance detection of unsafe operation of a system or process.

The present invention is based on the principle that wavelet transforms can be used to denoise data efficiently. Wavelet transform methods can be suitably built-up to obtain wavelet coefficients that can primarily be used to obtain true signal inferences from signals monitoring process variables by apparatus. The true signal inferences can be further used for online identification of safe process operation and advance detection of unsafe process operation.

In an embodiment of the present invention, one or more sensors are used to obtain signals (which may contain noise) from a process or apparatus and the monitored data is digitized by A/D converter and obtain digital monitored data sets organized in a way for applying wavelet transforms. It should be noted that the sensors monitor data on-line and describe the process states in the process variables being monitored, which can be used to determine the process outcome in terms of identification of safe process operation and advance detection of unsafe process by an online operation described hereafter.

In another embodiment of the present invention, derivatives of the noisy data are obtained and are treated as new data sets for further processing by wavelet transforms to obtain scalograms.

In yet embodiment of the present invention, wavelet transform of the derivative data is taken and is resolved into a plurality of wavelet scales that bring out the properties of the data as a function of time. Characteristics in the power distribution of the derivative data at different wavelet scales can be used to identify scales with noise in the derivative data and those which represent true data in the scalogram and thereby effecting a separation of scales. By taking wavelet transform of the derivative data the noise content in the signal lie in the finer resolution wavelet scales.

In still another embodiment of the present invention, further properties about the change in the process variable in time is obtained from noise-free first-order derivative data of the monitored variable to make online identification of safe process operation and advance detection of unsafe process operation. By taking inverse wavelet transform of the scales containing the true derivative data, wavelet scales are separated into those representing noisy and true derivative data which in turn, permits the changes occurring in time in the monitored variable to be inferred. The size of the data subject to wavelet transforms determines the number of wavelet scales in an orthogonal dyadic wavelet transformation. Inferences by inspection of the total power in the wavelet scales and identifying a critical wavelet scale (say, m) that demarcates the scales containing the noise component with that of the signal component can be made. By setting all wavelet coefficients belonging to scales on the finer side (i.e., <m) of the critical scale will remove the noise component in the data Inverse wavelet transform, using wavelet coefficients belonging to scales on the coarser side (i.e., >m) of the critical scale will result in true derivative data properties being retrieved. By way of examples a wide variety of processes, including batch, continuous stirred-tank, tubular and catalytic reactors are presented to show the retrieval of noise-free, first-order derivative data sets.

In one more embodiment of the present invention, a new second-order derivative data set is obtained from the noise-free first-order derivative data of the monitored variable. Values of the acceleration inferred from the second derivative data set in the monitored variable can be used for online advance detection of unsafe process operation whereby control of the process could be lost in near future. Stated otherwise, low or high values of the time-dependent acceleration in the monitored process variable can be used to develop criteria for identification of safe and advance detection of unsafe process operation.

In one another embodiment of the present invention, the values of the acceleration in the monitored variable can be obtained by suitably taking the wavelet transform of the second derivative data computed from the cleaned first derivative data. Accurate inferences about the nature of acceleration can be obtained by inspection of the power distribution in the wavelet coefficients at different scales obtained by the process of wavelet transform. A critical scale (say, m') can be identified that can be used to retrieve true second derivative data without the disturbances arising from finite accuracy in the process of computing the differentiation. The second derivative data set can be denoised by setting wavelet coefficients in finer scales (i.e., <m') equal to zero. The coarser scales (i.e., >m') can be used for inverse wavelet transform to make inferences about the acceleration in the monitored process variable.

In an embodiment of the present invention, the information gained by the process of making inferences from data about changes and acceleration in the monitored variable is reliable and accurate criteria and the same can be used for online identification of safe process operation and advance detection of unsafe process operation.

In another embodiment of the present invention, the results of identification of safe process operation and advance detection of unsafe process operation are used to obtain a new signal that can be used to activate alarm apparatus or to take corrective actions when advance detection of unsafe operation is diagnosed. The method being simple, quick and accurate, its repeated application with digitized data measured in real-time for different sampling times and data lengths are possible.

Preferably, the present invention provides a method for an online identification of safe operation and advance detection of unsafe operation of a system or a process in presence of noise in sensor measurements or fluctuations in variables measured, said method consisting the steps of:

(a) obtaining an online signal from one or more sensors monitoring/measuring process states or operation of the system at specified time intervals, wherein said online signal being in the form of a time series data relating to variation in one or more process variables;

(b) digitizing said online signal of step (a) to obtain a digitized data set;

(c) differentiating the digitized data set of step (b) to obtain a first derivative data set;

(d) taking wavelet transformation of the first derivative data set of step (c) to obtain scalogram in terms of wavelet coefficients;

(e) computing power distribution for individual wavelet scale of step (d) from said wavelet coefficients at all wavelet scales;

(f) computing from the power distribution of step (e) a critical wavelet scale at which finer scales are separable with respect to coarser scales, wherein said finer scales have wavelet coefficients attributable to noise and said coarser scales have wavelet coefficients attributable to true first derivative data (from step-(d));

(g) setting the value of the wavelet scales as zero, when the wavelet coefficients corresponding to the finer scales are less than or equal to the critical wavelet scale of step (f); or retaining the value of the wavelet scales, when the wavelet coefficients corresponding to the coarser scales are greater than the critical wavelet scale;

(h) computing inverse wavelet transform of the wavelet coefficients of step-(g) at different scales to get de-noised first derivative data;

(i) repeating the steps (d) through (h) on de-noised first derivative data to obtain de-noised second derivative data;

(j) testing criteria for unsafe operation based on simultaneous positivity in time of the de-noised first derivative data and de-noised second derivative data, subject to the condition that the power in the coarser scales for the de-noised second derivative data is finite;

(k) detecting unsafe process operation and initiating necessary corrective measures when the criteria in step (l) are satisfied, and (l) identifying safe process operation and repeating steps (a) to (j) when the criteria in step (l) are not satisfied.

In an embodiment of the present invention, the system or process from which time-series data is obtained is independent of the parameter values of operation.

In another embodiment of the present invention, the system or process includes chemical reactors including batch, continuous stirred tank, fixed-bed, biochemical, polymerization, fluidized-bed, catalytic/noncatalytic, combustion and other physical multi-phase systems, flow systems with simple/complex hydrodynamic systems including turbulence and seismographic instruments. The preferred source for obtaining time-series data for unsafe operation is selected from chemical reactors or physical systems with the intrinsic property of exhibiting unsafe or catastrophic behavior.

In yet another embodiment of the present invention, the sensors in step (a) are located on apparatus/equipments taking part in the process.

In still another embodiment of the present invention, the online signal is obtained from multiple sensors monitoring/measuring the variables at different spatial positions simultaneously from said apparatus/equipment.

In one more embodiment of the present invention, the online signal is obtained from multiple sensors monitoring/measuring the variables at unequal sampling time from said apparatus/equipment.

In one another embodiment of the present invention, the online signal explicitly denotes the variables.

In an embodiment of the present invention, the online signal implicitly denotes the variables.

In another embodiment of the present invention, the online signal denotes re-scaled values of monitored process variables.

In yet another embodiment of the present invention, the online signal implicitly denoting the variable includes data on spectroscopic absorption, potential difference, conductance, temperature, concentration, flow rates and viscosity.

In still another embodiment of the present invention, the wavelet transformation methods used include orthogonal wavelet transformation, bi-orthogonal wavelet transformation, continuous wavelet transformation and discrete wavelet transformation.

In one more embodiment of the present invention, the wavelet types are selected from Daubechies, Haar, spline, Morlet, Battle-Lemarie, Meyer, Mexican-hat, Coiflet and Symlet preferably Daubechies and include the alternate methodologies for obtaining the wavelet transform (fast wavelet transform, convolution, inner product, scaling functions) and its inverse by corresponding methods.

In one another embodiment of the present invention, wherein in step (b), the analog signal is converted digitized signal feeding the analog signal into a programmed device with a storage medium.

In an embodiment of the present invention, wherein in step (k), the necessary corrective measure includes switching ON an alarm device, providing feed back to corrective system.

In another embodiment of the present invention, wherein digitized data are converted to analog signals using a digital to analog converter for purposes of sounding alarms and activating corrective systems.

In the present invention the means for identification of safe process operation and detection of unsafe process operation is obtained in an automated way from the wavelet coefficients by inferences made from the characteristics of the power distribution at various scales. The method does not employ hard/soft thresholding based on statistical properties of the signal. Further more the results of detecting of unsafe process operation is converted to an analog signal using a digital to analog (D/A) converter to yield a signal that triggers alarms suitably placed in the process environment or for initiating other corrective measures on the process.

The present invention also provides an apparatus for online identification of safe operation and advance detection of unsafe operation of a system or a process in presence of noise in sensor measurements or fluctuations in variables measured, said apparatus consisting:

(a) one or more sensors monitoring/measuring process states or operation of the system at specified time intervals for providing an online signal, wherein said online signal being in the form of a time series data relating to variation in one or more process variables;

(b) a digitizing means connected to the sensors for digitizing said online signal of step (a);

(c) a differentiating means coupled to said digitizing means for differentiating the digitized data set of and obtain a first derivative data set;

(d) a first computing means programmed to receive the first derivative data set and compute wavelet transform of the first derivative data set to obtain scalogram in terms of wavelet coefficients;

(e) a second computing means programmed to compute power distribution for individual wavelet scale of step (d) from said wavelet coefficients at all wavelet scales;

(f) a third computing means configured to receive the power distribution from the second computing means and programmed to compute a critical wavelet scale at which finer scales are separable with respect to coarser scales, wherein said finer scales have wavelet coefficients attributable to noise and said coarser scales have wavelet coefficients attributable to true first derivative data;

(g) a means for setting the value of the wavelet scales as zero, when the wavelet coefficients corresponding to the finer scales are less than or equal to the critical wavelet scale of step (f); or retaining the value of the wavelet scales, when the wavelet coefficients corresponding to the coarser scales are greater than the critical wavelet scale;

(h) a means for computing inverse wavelet transform of the wavelet coefficients of step-(g) at different scales to get de-noised first derivative data;

(i) a testing means for testing criteria for unsafe operation based on simultaneous positivity in time of the de-noised first derivative data and de-noised second derivative data, subject to the condition that the power in the coarser scales for the de-noised second derivative data is finite;

(j) an identifying means for identifying the operation as unsafe operation/safe operation, said identifying means being connected to the testing means at its input end and being connected to an alarm/error correcting system at its out put end.

In an embodiment of the present invention, the system or process from which time-series data is obtained is independent of the parameter values of operation.

In another embodiment of the present invention, the system or process from which time-series data is obtained includes chemical reactors including batch, continuous stirred tank, fixed-bed, biochemical, polymerization, fluidized-bed, catalytic/noncatalytic, combustion and other physical multi-phase systems, flow systems with simple/complex hydrodynamic systems including turbulence and seismographic instruments.

In yet another embodiment of the present invention, the sensors in step (a) are located on system/equipments taking part in the process.

In still another embodiment of the present invention, the online signal is obtained from multiple sensors monitoring/measuring the variables at different spatial positions simultaneously from said system/equipments taking part in the process.

In one more embodiment of the present invention, the online signal is obtained from multiple sensors monitoring/measuring the variables at unequal sampling time from said system/equipments taking part in the process.

In one another embodiment of the present invention, the online signal explicitly denotes the variables.

In an embodiment of the present invention, the online signal implicitly denotes the variables.

In another embodiment of the present invention, the online signal denotes re-scaled values of monitored variables.

In yet another embodiment of the present invention, the online signal implicitly denoting the variable includes data on spectroscopic absorption, potential difference, conductance, temperature, concentration, flow rates and viscosity.

In still another embodiment of the present invention, the means for computing wavelet transformation include orthogonal wavelet transformation means, bi-orthogonal wavelet transformation means and continuous wavelet transformation means.

In one more embodiment of the present invention, the wavelet types are selected from Daubechies, Haar, spline, Morlet, Battle-Lemarie, Meyer, Mexican-hat, Coiflet and Symlet preferably Daubechies and the alternate methodologies for obtaining the wavelet transform (fast wavelet transform, convolution, inner product, scaling functions) and its inverse by corresponding methods.

In one another embodiment of the present invention, the digitized data are converted to analog signals using a digital to analog converter for purposes of sounding alarms and activating corrective systems.

According, to the present invention the method does not employ hard/soft thresholding based on statistical properties of the signal because accurate inferences from the characteristics of the power distribution at various scales can be made.

Figure 2:
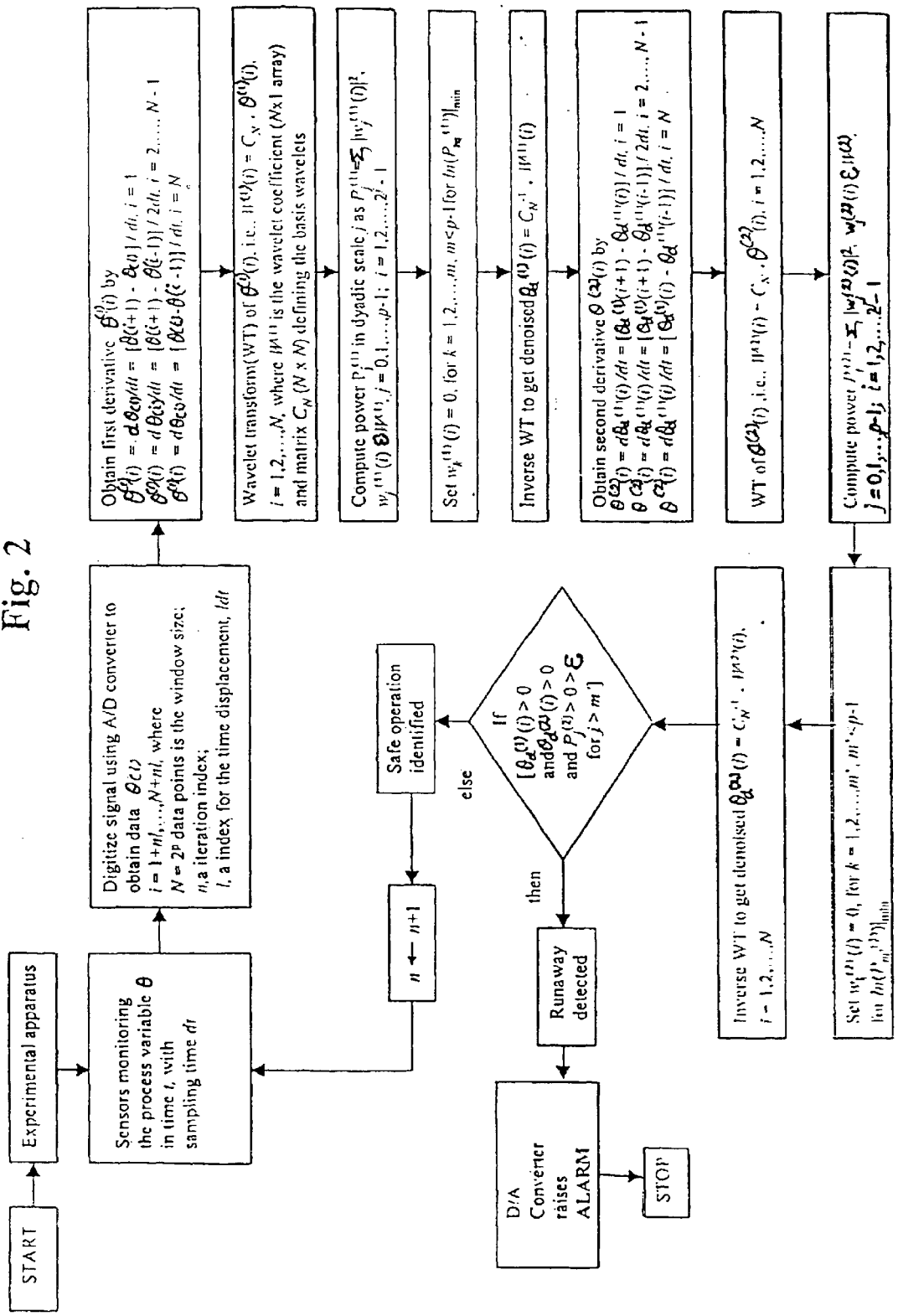
FIG. 2 shows the flow chart of the method for identification of safe operation and advance detection of unsafe operation of a system or process.

The present method and apparatus used for identification of normal safe process operation and detection of abnormal unsafe process operation from noisy signals leading to triggering of alarms comprises a novel combination of means not envisaged so far. A complete technical block diagram showing the apparatus and the flow chart depicting the method in detail are presented in FIGS. 1 and 2 respectively and are further described below.

In an embodiment of the present invention, it is also understood that the process of taking wavelet transforms by a suitable choice of wavelets from Daubechies, Haar, spline, Morlet, Battle-Lemarie, Meyer, Mexican-hat, Coiflet or Symlet, can be carried out, preferably using the Daubechies family of wavelets. Daubechies wavelets is characterized by a set of numbers called wavelet filter coefficients with the simplest wavelet having only four coefficients represented as $C_0, C_1, C_2, C_3$. A description of the Daubechies wavelets has been discussed in Daubechies, I., "Ten Lectures on Wavelets", Society for Industrial and Applied Mathematics, Philadelphia, Pa. [1992]. The wavelet transform comprises a smoothing filter H that provides a moving average of four points at a time of the digitized datra for the simplest situation. The residual from smoothing is obtained from a detailed filter G whose frequency response is a mirror image of the smoothing filter H. Repeated applications of the wavelet transform on smoothened signals yields in parallel the details and the smoothened features of the signal at various wavelet scales. For a complete description of the process of wavelet transform reference is made to Press, W. H., Teukolsky, S. A., Vetterling, W. T. and Flannery, B. P., "Numerical Recipes in Fortran, The Art of Scientific Computing", $2^{nd}$ Edition, Cambridge University Press [1986].

The Daubechies-4 (Daub-4) wavelet is an example of a simple orthogonal basis of wavelets with lossless signal reconstruction capability. Other orthogonal wavelets like Haar are also well-known for their orthogonal properties but we shall exemplify the method of this invention using the Daub-4 wavelet as a basis. The Daub-4 wavelet has four filter coefficients where the following transformation matrix $C_N$ acts on a column vector of data on the right, namely, $$\begin{pmatrix} c_0 & c_1 & c_2 & c_3 & & & & & \\ c_3 & -c_2 & c_1 & -c_0 & & & & & \\ & & c_0 & c_1 & c_2 & c_3 & & & \\ & & c_3 & -c_2 & c_1 & -c_0 & & & \\ & & & & \cdots & & & & \\ & & & & \cdots & c_0 & c_1 & c_2 & c_3 \\ & & & & & c_3 & -c_2 & c_1 & -c_0 \\ c_2 & c_3 & & & & & & c_0 & c_1 \\ c_2 & -c_0 & & & & & & c_3 & -c_2 \end{pmatrix}$$

In this case the $C_0, C_1, C_2, C_3$ act as the smoothing filter H. On the other hand, $C_3, -C_2, C_1, -C_0$ act as a quadrature mirror filter G which is not the smoothing filter when convolved with the data $\theta(i)$ and gives the detailed component at the corresponding wavelet scale. Note that the size of the matrix $C_N$ is a N×N matrix chosen to reflect the size of the data $\theta(i)$ where, $i=1+nl, \ldots, N+nl$, and $N=2^P$ data points is the data size. Here n is an iteration index that facilitates an online analysis along with l an index for the time displacement ldt with sampling time dt. The choice of N data points permits $0, \ldots, p-1$ dyadic scales in the $C_N$ matrix with the necessary translation of the scaled Daub-4 wavelets at a chosen scale before convolving with the data.

For noisy data, because, noise is present at all scales a simple wavelet transformation of the data $\theta(i)$ would distribute the noise at all scales. Recognizing that the signal contribution at different scales depend upon the signal features it is to be appreciated that removing the noise content at each scale by a rational method is not easy. It would be necessary to process the data $\theta(i)$ so that the contributions to the signal by noise be shifted selectively to the finer scales. It is known that the process of differentiation facilitates the upward movement of noise to higher frequencies by a first order moving average process. The benefits of differentiating the data can be advantageously exploited by taking the wavelet transform of the differentiated data. Formally but concisely, the differentiation to obtain the first order derivative data $\theta^{(1)}(i)$ $$\theta^{(1)}(i)=d\theta(i)/dt=[\theta(i+1)-\theta(i)]/dt, \ i=1$$
$$\theta^{(1)}(i)=d\theta(i)/dt=[\theta(i+1)-\theta(i-1)]/2dt, \ i=2,\ldots,N-1$$
$$\theta^{(1)}(i)=d\theta(i)/dt=[\theta(i)-\theta(i-1)]/dt, \ i=N \quad (1)$$

followed by wavelet transform of $\theta^{(1)}(i)$ viz.

$$W^{(1)}(i)=C_N.\theta^{(1)}(i) \quad (2)$$

yields $W^{(1)}(i)$, a N×1 array of wavelet coefficients $w_j^{(1)}(i) \in W^{(1)}$ for the different scales j viz., $j=0,1,\ldots,p-1$ for $i=1,2,\ldots,2^j-1$. The power distribution in the wavelet coefficients $P_j^{(1)}=\Sigma_j|w_j^{(1)}(i)|^2$ at scales $j=0,1,\ldots,p-1$ yields valuable information about the nature of noise in the signal and can provide direct inferences to be made on the scales which contain the noise components. In the examples studied the power distribution at various scales shows a minima that may be used for separation of noise and comes out as a natural outcome of the method employed. Thus by setting $w_k^{(1)}(i)=0$, for $k=1,2,\ldots,m$, $m<p-1$ for $\ln(P_m^{(1)})|_{min}$ and obtaining an inverse wavelet transform (using the inverse of the $C_N$ matrix $C_N^{-1}$) it is possible to obtain denoised first derivative data by $$\theta_d^{(1)}(i)=C_N^{-1}.W^{(1)}(i) \quad (3)$$

The denoised first-order derivative data, $\theta_d^{(1)}(i)$ can be used for identification of safe operation and advance detection of unsafe operation in processes with robustness especially when the signals are obtained from processes exhibiting commonly encountered highly sensitive and nonlinear dynamics. The $\theta_d^{(1)}(i)$ is a true measure of the changes in the process variable in time and has therefore considerable significance.

The advantage of the wavelet transform denoising method can be exploited beneficially to obtain information about the rapidity with which the changes in the process variables occur in time. Inferences made would complement that gained by obtaining the denoised first-order derivative data $\theta_d^{(1)}(i)$. The accelerating characteristics of the process variables may be evaluated by differentiating $\theta_d^{(1)}(i)$ to obtain $\theta^{(2)}(i)$, via., $$\theta^{(2)}(i)=d\theta_d^{(1)}(i)/dt=[\theta_d^{(1)}(i+1)-\theta_d^{(1)}(i)]/dt, \ i=1$$
$$\theta^{(2)}(i)=d\theta_d^{(1)}(i)/dt=[\theta_d^{(1)}(i+1)-\theta(i-1)]/2dt, \ i=2,\ldots,N-1$$
$$\theta^{(2)}(i)=d\theta_d^{(1)}(i)/dt=[\theta_d^{(1)}(i)-\theta_d^{(1)}(i-1)]/dt, \ i=N \quad (4)$$

followed by wavelet transform of $\theta^{(2)}(i)$ viz.

$$W^{(2)}(i)=C_N.\theta^{(2)}(i) \quad (5)$$

to obtain $W^{(2)}(i)$, a N×1 array of wavelet coefficients $w_j^{(2)}(i) \in W^{(2)}$ for the different scales j viz., $j=0,1,\ldots,p-1$ for $i=1,2,\ldots,2^j-1$. By setting $w_k^{(2)}(i)=0$, for $k=1,2,\ldots,m'$, $m'<p-1$ again based on observance of a minima in the power distribution $\ln(P_{m'}^{(2)})|_{min}$, where $P_{j|wj}^{(2)}=\Sigma_j^{(2)}(i)|^2$, separation of wavelet scales for denoising $\theta^{(2)}(i)$ is possible by taking the inverse wavelet transform, i.e., $$\theta_d^{(2)}(i)=C_N^{-1}.W^{(2)}(i) \quad (6)$$

where $\theta_d^{(2)}(i)$ is the denoised second-order derivative data that yields information about the accelerating properties in the changes of the process variable $\theta(i)$ in time t.

In the present method from the behavioral properties of $\theta_d^{(1)}(i)$ and $\theta_d^{(2)}(i)$, the early detection of an unsafe process can be obtained by positivity of $\theta_d^{(1)}(i)$, $\theta_d^{(2)}(i)$ and finite power in the acceleration in the changes observed in variable states i.e., $$\theta_d^{(1)}(i)>0 \quad (7a)$$
$$\theta_d^{(2)}(i)>0 \quad (7b)$$
$$ln(P_j^{(2)})|>\epsilon,; \ j>m'. \quad (7c)$$

The criteria in Equation 7a, 7b is made robust by ensuring that the power content at scales greater than m' have a finite visible acceleration so that false alarms are not raised. Thus, the detection of unsafe operation is confirmed only when there is a finite power in the second derivative scales and given by the condition in Equation 7c. Evaluation of the present method for noisy signals obtained with specific examples covering a number of chemical reactor types was carried out and show that satisfaction of the above conditions permits accurate and quick inferences to be made regarding the advance detection of an unsafe process. The early detection of unsafe conditions can be employed to activate alarms and other contingency plans for regaining control of the process shutdown, etc.

In the event when the above conditions are not satisfied it may be inferred that the process is operating safely and via process monitoring of the monitored process variable $\theta(i)$ the process of online identification of safe operation and advance detection of unsafe process operating conditions could be continued online by resetting the values of $\theta(i)$ to new digitized measurements $i=1+(n+1)l, \ldots, N+(n+1)l$ made available by the sensor monitoring of the process variable state in real-time t. The method can thus be executed in an iterative fashion on a continuous basis for successive increments in the iterative counter n and time displacement ldt.

The invention is further described in details with reference to the examples given below which are provided to illustrate the invention and therefore, should not be construed to limit the scope of the invention.

EXAMPLE-1

Figure 3:
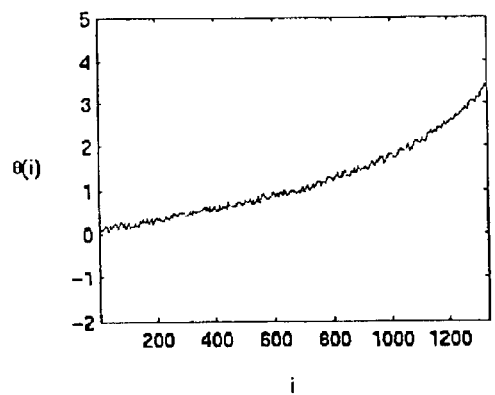
FIG. 3 shows the advance detection of unsafe operation for a batch reactor. The results show that the reactor is operating at an unsafe condition for the heat transfer control parameter, $\alpha=6.0$. It can be seen that the onset of unsafe operation of the reactor has been detected in advance at time index i=1100.
Figure 3:
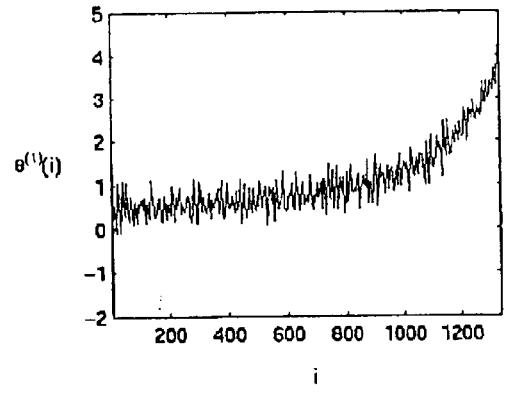
Figure 3:
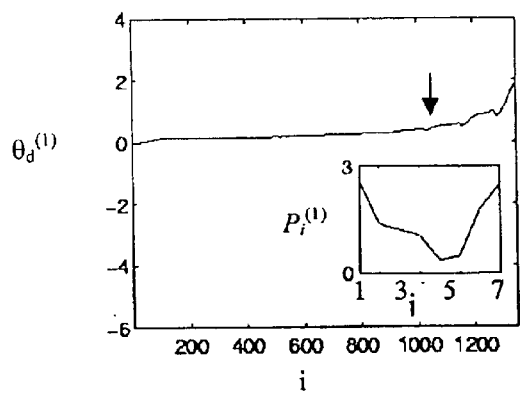
Figure 3:
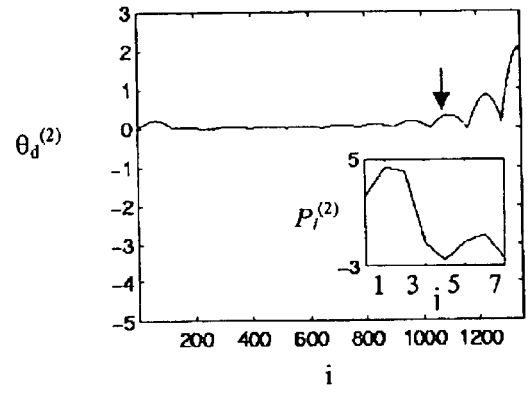

This example is provided for identification of safe operation and advance detection of unsafe operation from a noisy signal obtained from a batch chemical reactor. The example pertains to operating a single irreversible exothermic reaction, where, to compensate for the heat generated the reactor wall has a jacket with coolant flowing through it. For practical purposes the process can be made to operate at chosen values of a control parameter $\alpha$. The parameter $\alpha$ is a user-defined function using U: heat transfer coefficient and S: heat transfer area and normalized by the heat generation rate at a chosen temperature $\theta_0$. For $\alpha=6.0$, FIG. 3(a) shows the rescaled measurements of the process temperature $\theta(i)$ as reaction proceeds in time. The fluctuating nature of $\theta(i)$ is seen due to the presence of noise in the monitored data suitably digitized at sampling intervals of time dt=0.01 seconds. Taking N=256 points (corresponding to a time gap=0.01×256=2.56 time units) the above method for online identification of safe operation and detection of unsafe process operation was carried out. The time displacement for each increase in iteration n was set at ldt=128×dt=1.28 time units.

FIG. 3(b) shows the online computing of first derivative data $\theta^{(1)}(i)$ from process variable measurements as per Equation 1. Following the method of denoising the first derivative data in the manner described by Equation 2, FIG. 3(c) presents the results of denoising $\theta^{(1)}(i)$ to obtain $\theta_d^{(1)}(i)$. For N=256 the number of wavelet scales is p=8 and indexed as $j=0, \ldots, 7$. The inset in FIG. 3(c) shows the distribution in power at various scales showing a clean minima at scale j=m=4. Setting $w_k^{(1)}(i)=0$ for $k=1,2,\ldots,m$, $m<p-1$ was therefore implemented before carrying out the inverse wavelet transform according to Equation 3. The results shown in FIG. 3(c) clearly show the efficiency in denoising the derivative data signal online. Importantly it may be noted that beyond t>1100 the $\theta_d^{(1)}(i)$ is greater than zero.

FIG. 3(d) shows the online computing of the denoised second derivative data $\theta_d^{(2)}(i)$ from $\theta_d^{(1)}(i)$ following the denoising wavelet transform method described in Equations 4–6. The inset in FIG. 3(d) shows the distribution in power at various scales showing a clean minima at scale j=m'=4 which was used to reset the wavelet coefficients $w_k^{(2)}(i)=0$ for $k=1,2,\ldots,m'$, $m'<p-1$. It is seen that beyond t=1,100, $\theta_d^{(2)}(i)$ varies significantly from zero.

Beyond t>1100 the results show that the rate of heat generation in the reactor is far greater than the rate of heat removal at which time the system is initiated into an unsafe operation condition. But, it is possible to clearly detect this condition in advance via the criteria stated in Equation 7(a,b). The evaluation of the criteria could not have been possible using the data presented in FIG. 3(b) because of the noise in the first derivative data arising due to the noise seen in the sensor measurements and the process of evaluating derivatives. The utility of the invention is therefore made apparent. It needs to be noted that the method of detection is carried out without using the operating parameter value of $\alpha$ per se in the computing, as will be shown in the examples validating the method and discussed below.

Figure 4:
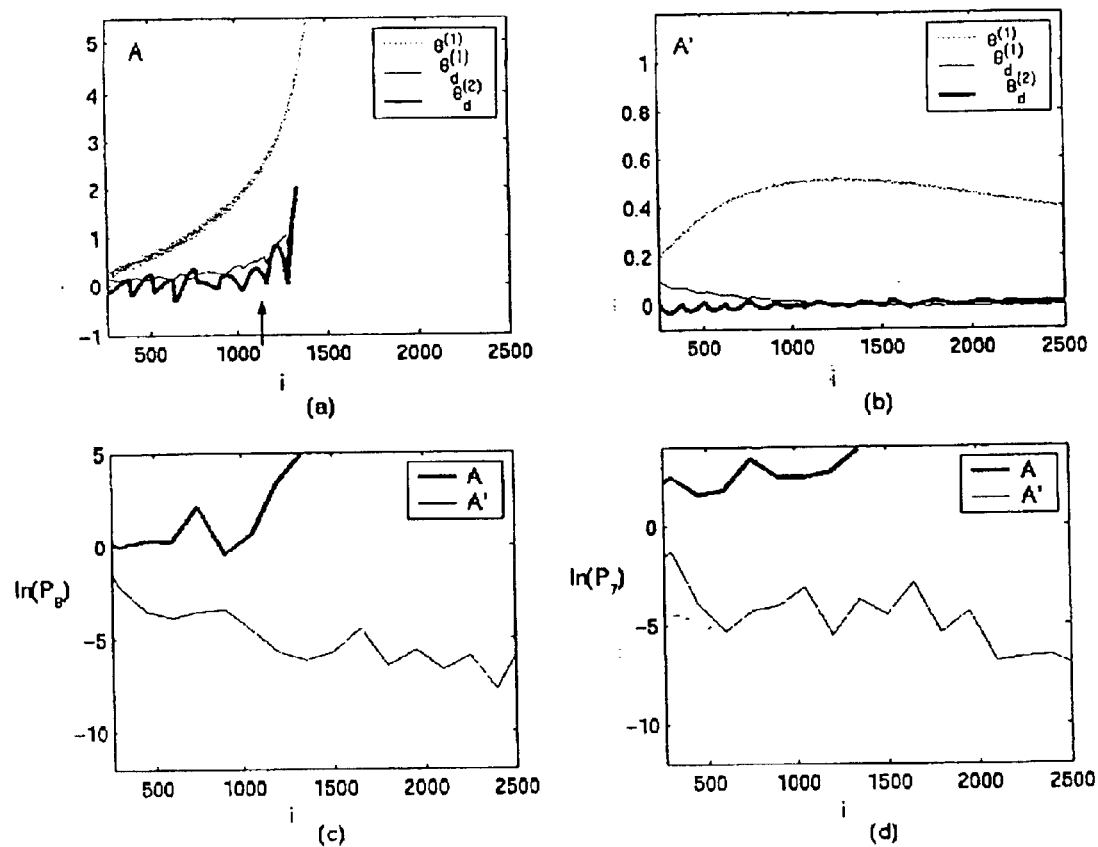
FIG. 4 represents identification of safe operation and detection of unsafe operation for a batch reactor. The results show that the reactor is operating at an unsafe condition for $\alpha=A=6.0$ while for $\alpha=A'=26.0$, the reactor is identified to be operating safely.

Online data was monitored for two sets of external heat transfer parameter $\alpha=A=6.0$ and $\alpha=A'=26$ with the online method of identification of safe operation and detection of unsafe operation was carried out. The results obtained are given in FIG. (4). FIGS. 4(a,b) show the data $\theta(i)$ as it is monitored online for $\alpha=A$ and $\alpha=A'$, respectively. The $\theta(i)$ has the spread because of the noise present in the measurements. Following the method of online denoising to obtain $\theta_d^{(1)}(i)$ and $\theta_d^{(2)}(i)$ for the cases were carried out, respectively, and the results shown in FIGS. 4(a,b). The initiation of simultaneous positivity in $\theta_d^{(1)}(i)$ and $\theta_d^{(2)}(i)$ [Equation 7(a,b)], for $\alpha=A$ is detected accurately and quickly at onset whereby $\theta(i)$ begins to increase rapidly due to the process characteristics at this operating condition which makes it unsafe. On the other hand FIG. 4(b) gives the result that even though the noisy profile has increasing $\theta(i)$ the criteria in Equation 7(a,b) is never satisfied and infers the process operation to be safe.

The criteria in Equation 7(a,b) is scientifically sound, but, there are situations when the sensitivity to detection of unsafe condition requires that the power content at scales greater than m' should be analyzed for complete robustness due to the fact that there should be a finite acceleration in the change that occurs in the monitored process variable in the event when the detection of unsafe operating conditions has to be made quickly. Thus, the detection of unsafe operation is tested for finite power in the second derivative scales and given by the condition Equation 7(c). FIGS. 4(c,d) show the online power $P_j^{(2)}$, for two wavelet scales j=7,8>m' for the cases $\alpha=A$ and $\alpha=A'$, respectively. For the unsafe operation ($\alpha=A$) the trend in the power profile $P_j^{(2)}$ shows finite power far in excess of that shown for safe process operation when $\alpha=A'$. This added criterion on a rational basis is seen to enhance the advance detection of unsafe operation.

EXAMPLE-2

Figure 5:
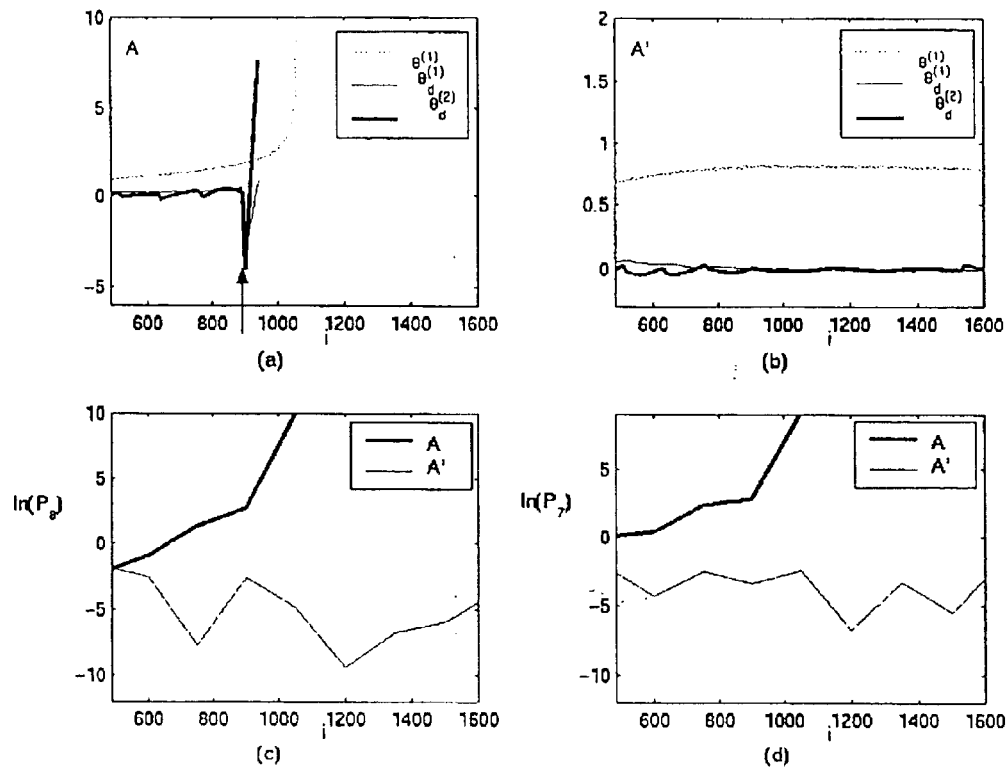
FIG. 5 represents identification of safe operation and detection of unsafe operation for a continuous stirred tank reactor (CSTR). The results show that the reactor is operating at an unsafe condition for $\alpha=A=14.0$ while for $\alpha=A'=20.0$, the reactor is identified to be operating safely.

This example is provided for identification of safe operation and detection of unsafe operation from a noisy signal obtained from a continuous stirred tank reactor (CSTR). The example pertains to operating a single irreversible exothermic reaction, where, to compensate for the heat generated the reactor wall has a jacket with coolant flowing through it. Also, as in Example-1, the process can be made to operate at chosen values of a control parameter $\alpha$. The reaction considerations are the same as Example-1, except, that the results are presented for two cases with α=A=14.0 and α=A'=20.0 with flow characterized by the residence time in the CSTR. The sampling interval of time dt=0.01 time units and with N=256 points (corresponding to a time gap=0.01× 256=2.56 time units) is used to detect unsafe operation in resealed temperature θ(i). The results presented in FIG. 5 for identification of safe process operation and advance detection of unsafe operation are presented in a way similar to that in Example-1 [FIG. 4]. In FIGS. 5(a–d) validate the results because for α=A, the process is detected in advance to be unsafe at t=925 while for α=A', the process is identified as safe by the online method.

EXAMPLE-3

Figure 6:
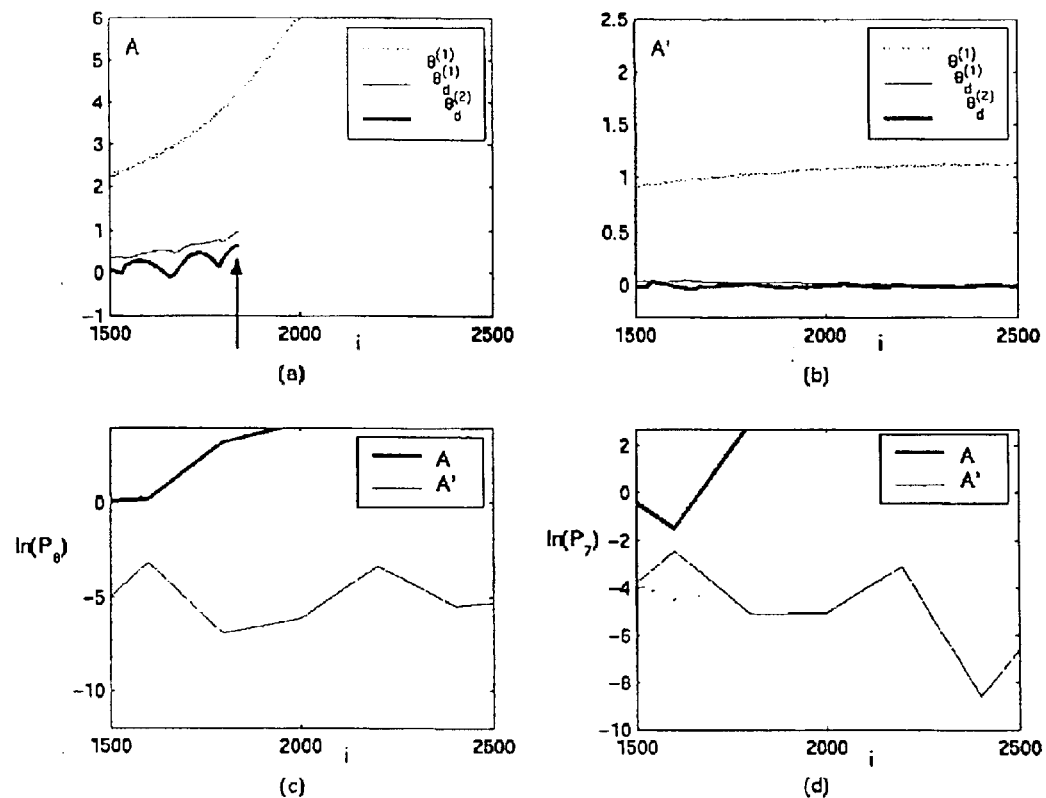
FIG. 6 represents identification of safe operation and detection of unsafe operation for a tubular reactor. The results show that the reactor is operating at an unsafe condition for $\alpha=A=5.0$ while for $\alpha=A'=14.0$, the reactor is identified to be operating safely.

This example is provided for identification of safe operation and detection of unsafe operation from a noisy signal obtained from a homogeneous tubular reactor. For the tubular reactor convection and dispersion mechanisms occur for the single-phase process. The tubular reactor pertains to operating a single irreversible exothermic reaction, where, to compensate for the heat generated the tubular reactor wall has a jacket with coolant flowing through it. Also, as in Example-1, the process can be made to operate at chosen values of a control parameter α. The reaction considerations are the same as Example-1, except, that the results are presented for two cases with α=A=5.0 and α=A'=14.0. The sampling interval of time dt=0.01 time units and with N=256 points (corresponding to a time interval=0.01×256=2.56 time units) is used to monitor reactor operation in resealed temperature θ(i) at the exit of the reactor. The results of study are presented in FIG. 6 for identification of safe and advance detection of unsafe operation are presented in a way similar to Example-1 [FIG. 4]. FIGS. 6(a–d) validate the results because for α=A, the process is detected in advance as unsafe at i=1875 while for α=A', the process is detected as safe by the online method.

EXAMPLE-4

Figure 7:
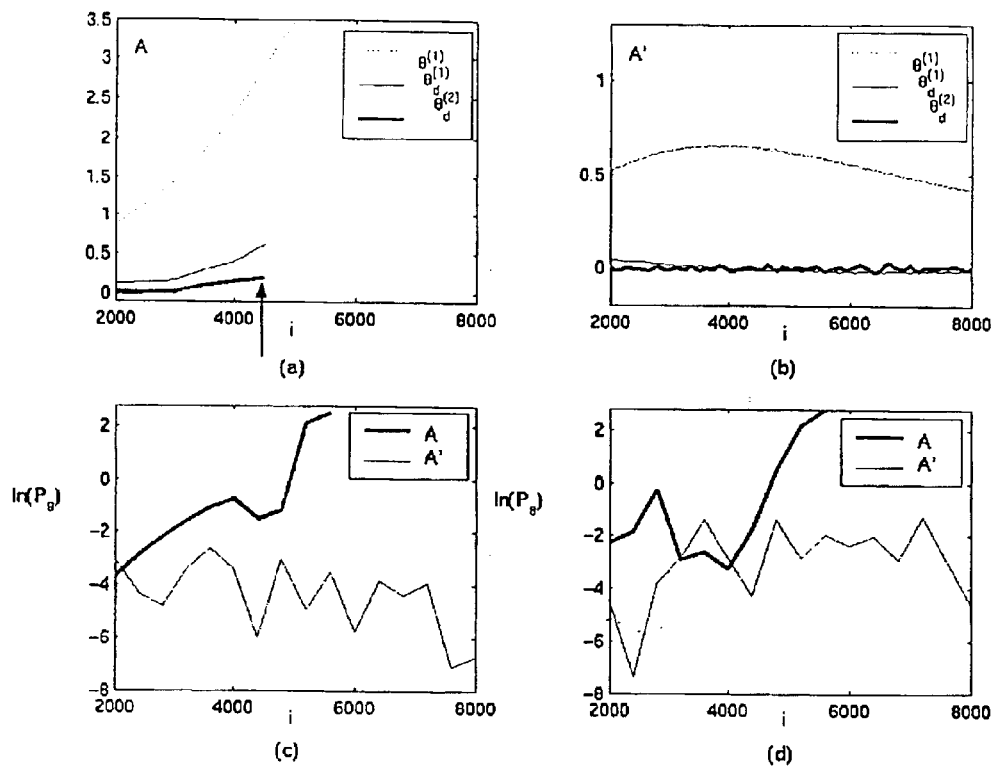
FIG. 7 represents identification of safe operation and detection of unsafe operation for a cooled tubular catalytic reactor reactor. The results show that the reactor is operating at an unsafe condition for α=A=9.0 while for α=A'=20.0, the reactor is identified to be operating safely.

This example is provided for identification of safe operation and detection of unsafe operation from a noisy signal obtained from a cooled tubular catalytic reactor. In this example the process encompasses the situation when both axial heat and mass dispersion with inter-phase gradients are also considered. The temperature variations within the catalyst particle have been ignored and measurement of resealed temperature is at the exit of the reactor. The example pertains to operating a single irreversible exothermic reaction, where, to compensate for the heat generated the reactor wall has a jacket with coolant flowing through it. Also, as in Example-1, the process can be made to operate at chosen values of a control parameter α. The results are presented for two cases with α=A=9.0 and α=A'=20.0. The sampling interval of time dt=0.01 time units and with N=512 points (corresponding to a time interval=0.01×512=5.12 time units) is used to detect unsafe operation in rescaled temperature θ(i). The results of study are presented in FIG. 7 for identification safe and advance detection of unsafe process operation and presented in a way similar to Example-1 [FIG. 4]. In FIGS. 7(a–d) validate the results since for α=A, the process becomes unsafe while for α=A' the process is detected as safe by the online method.

Advantages of the Present Invention

1. The method of the invention is simple and accurate because of which precise inferences can be arrived at.

2. The identification of safe process operation and detection of unsafe process operation can be achieved efficiently with quick response by digitized signals of short duration.
3. The method is not based on thresholding of wavelet coefficients based on statistical inferences.
4. The method is not based on characteristics of noise and its statistical distribution properties.
5. The method does not require a mathematical model of the process to be known and is not based on the specific operating conditions with respect to process parameter values.
6. The method of the present invention is based on a procedure having a rational scientific basis.
7. While only certain important features of the invention have been illustrated and described, many modifications and changes can be implemented by those skilled in the art. It is, therefore, understood that the appended claims are intended to cover all such modifications and changes as fall within the spirit of invention. Thus, it is understood that the process of identification of safe operation and advance detection of unsafe operation described may be implemented using a variety of wavelet transforms employing different wavelet basis functions including discrete, orthogonal, bi-orthogonal, continuous (Daubechies, Haar, spline, Morlet, Battle-Lemarie, Meyer, Mexican-hat, Coiflet or Symlet); Alternate methodologies for obtaining the wavelet transform, fast wavelet transform, convolution, connection coefficients, etc.; Signal measurements being made from various types of chemical reactors and physical systems showing variations in process variables using sensors which monitor temperature, viscosity, thermal conductivity, chemical species concentrations, pressure or flow signals as time-series, from batch, continuous stirred tank, fixed-bed, biochemical, polymerization, fluidized-bed and other catalytic/noncatalytic reactors; multiple sensors monitoring measurements at different spatial positions simultaneously; signals measured at unequal sampling time; The data processed need not explicitly use relevant process variable values but implicitly values of variables related to the former using sensors monitoring spectroscopic absorption, potentials, conductances, IR measurements, etc. for temperatures, concentrations, flows, viscosities, etc.

What is claimed is:

1. A method for an online identification of safe operation and advance detection of unsafe operation of a system or a process in presence of noise in sensor measurements or fluctuations in variables measured, said method consisting the steps of:

(a) obtaining an online signal from one or more sensors monitoring/measuring process states or operation of the system at specified time intervals, wherein said online signal being in the form of a time series data relating to variation in one or more process variables;

(b) digitizing said online signal of step (a) to obtain a digitized data set;

(c) differentiating the digitized data set of step (b) to obtain a first derivative data set;

(d) taking wavelet transformation of the first derivative data set of step (c) to obtain scalogram in terms of wavelet coefficients;

(e) computing power distribution for individual wavelet scale of step (d) from said wavelet coefficients at all wavelet scales;

(f) computing from the power distribution of step (e) a critical wavelet scale at which finer scales are separable with respect to coarser scales, wherein said finer scales have wavelet coefficients attributable to noise and said coarser scales have wavelet coefficients attributable to true first derivative data (from step (d));

(g) setting the value of the wavelet scales as zero, when the wavelet coefficients corresponding to the finer scales are less than or equal to the critical wavelet scale of step (f); or retaining the value of the wavelet scales, when the wavelet coefficients corresponding to the coarser scales are greater than the critical wavelet scale;

(h) computing inverse wavelet transform of the wavelet coefficients of step (g) at different scales to get de-noised first derivative data;

(i) repeating the steps (d) through (h) on de-noised first derivative data to obtain de-noised second derivative data;

(j) testing criteria for unsafe operation based on simultaneous positivity in time of the de-noised first derivative data and de-noised second derivative data, subject to the condition that the power in the coarser scales for the de-noised second derivative data is finite;

(k) detecting unsafe process operation and initiating necessary corrective measures when the criteria in step (j) are satisfied, and (l) identifying safe process operation and repeating steps (a) to (j) when the criteria in step (j) are not satisfied.

2. A method as claimed in claim 1, wherein the system or process for obtaining time-series data is independent of the parameter values of operation.

3. A method as claimed in claim 1, wherein the system or process includes chemical reactors including batch, continuous stirred tank, fixed-bed, biochemical, polymerization, fluidized-bed, catalytic/noncatalytic, combustion and other physical multi-phase systems, flow systems with simple/complex hydrodynamic systems including turbulence and seismographic instruments.

4. The method as claimed in claim 1, wherein sensors in step (a) are located on apparatus/equipments taking part in the process.

5. The method as claimed in claim 1, wherein the online signal is obtained from multiple sensors monitoring/measuring the variables at different spatial positions simultaneously from said apparatus/equipment.

6. The method as claimed in claim 1, wherein the online signal is obtained from multiple sensors monitoring/measuring the variables at unequal sampling time from said apparatus/equipment.

7. A method as claimed in claim 1, wherein the online signal explicitly denotes the variables.

8. A method as claimed in claim 1, wherein the online signal implicitly denotes the variables.

9. A method as claimed in claim 1, wherein the online signal denotes re-scaled values of monitored process variables.

10. A method as claimed in claim 7, wherein the online signal implicitly denoting the variable includes data on spectroscopic absorption, potential difference, conductance, temperature, concentration, flow rates and viscosity.

11. A method as claimed in claim 1, wherein the wavelet transformation methods used include orthogonal wavelet transformation, bi-orthogonal wavelet transformation and continuous wavelet transformation.

12. A method as claimed in claim 11, wherein the wavelet types are selected from Daubechies, Haar, spline, Morlet, Battle-Lemarie, Meyer, Mexican-hat, Coiflet and Symlet.

13. A method as claimed in claim 1, wherein in step (b), the analog signal is converted digitized signal feeding the analog signal into a programmed device with a storage medium.

14. A method as claimed in claim 1, wherein in step (k), the necessary corrective measure includes switching ON an alarm device, providing feed back to corrective system.

15. A method as claimed in claim 1, wherein digitized data are converted to analog signals using a digital to analog converter for purposes of sounding alarms and activating corrective systems.

16. An apparatus for online identification of safe operation and advance detection of unsafe operation of a system or a process in presence of noise in sensor measurements or fluctuations in variables measured, said apparatus consisting:

(a) one or more sensors monitoring/measuring process states or operation of the system at specified time intervals for providing an online signal, wherein said online signal being in the form of a time series data relating to variation in one or more process variables;

(b) a digitizing means connected to the sensors for digitizing said online signal of step (a);

(c) a differentiating means coupled to said digitizing means for differentiating the digitized data set of and obtain a first derivative data set;

(d) a first computing means programmed to receive the first derivative data set and compute wavelet transform of the first derivative data set to obtain scalogram in terms of wavelet coefficients;

(e) a second computing means programmed to compute power distribution for individual wavelet scale of step (d) from said wavelet coefficients at all wavelet scales;

(f) a third computing means configured to receive the power distribution from the second computing means and programmed to compute a critical wavelet scale at which finer scales are separable with respect to coarser scales, wherein said finer scales have wavelet coefficients attributable to noise and said coarser scales have wavelet coefficients attributable to true first derivative data;

(g) a means for setting the value of the wavelet scales as zero, when the wavelet coefficients corresponding to the finer scales are less than or equal to the critical wavelet scale of step (f); or retaining the value of the wavelet scales, when the wavelet coefficients corresponding to the coarser scales are greater than the critical wavelet scale;

(h) a means for computing inverse wavelet transform of the wavelet coefficients of step-(g) at different scales to get de-noised first derivative data;

(i) a testing means for testing criteria for unsafe operation based on simultaneous positivity in time of the de-noised first derivative data and de-noised second derivative data, subject to the condition that the power in the coarser scales for the de-noised second derivative data is finite;

(j) an identifying means for identifying the operation as unsafe operation/safe operation, said identifying means being connected to the testing means at its input end and being connected to an alarm/error correcting system at its out put end.

17. An apparatus as claimed in claim 16, wherein the system or process from which time-series data is obtained is independent of the parameter values of operation.

18. A, apparatus as claimed in claim 16, wherein the system or process from which time-series data is obtained includes chemical reactors including batch, continuous stirred tank, fixed-bed, biochemical, polymerization, fluidized-bed, catalytic/noncatalytic, combustion and other physical multi-phase systems, flow systems with simple/complex hydrodynamic systems including turbulence and seismographic instruments.

19. An apparatus as claimed in claim 16, wherein sensors in step (a) are located on system/equipments taking part in the process.

20. An apparatus as claimed in claim 16, wherein the online signal is obtained from multiple sensors monitoring/measuring the variables at different spatial positions simultaneously from said system/equipments taking part in the process.

21. An apparatus as claimed in claim 16, wherein the online signal is obtained from multiple sensors monitoring/measuring the variables at unequal sampling time from said system/equipments taking part in the process.

22. An apparatus as claimed in claim 16, wherein the online signal explicitly denotes the variables.

23. An apparatus as claimed in claim 16, wherein the online signal implicitly denotes the variables.

24. An apparatus as claimed in claim 16, wherein the online signal denotes re-scaled values of monitored variables.

25. An apparatus as claimed in claim 23, wherein the online signal implicitly denoting the variable includes data on spectroscopic absorption, potential difference, conductance, temperature, concentration, flow rates and viscosity.

26. An apparatus as claimed in claim 16, wherein the means for computing wavelet transformation include orthogonal wavelet transformation means, bi-orthogonal wavelet transformation means and continuous wavelet transformation means.

27. An apparatus as claimed in claim 26, wherein the wavelet types are selected from Daubechies, Haar, spline, Morlet, Battle-Lemarie, Meyer, Mexican-hat, Coiflet and Symlet.

28. An apparatus as claimed in claim 16, wherein digitized data are converted to analog signals using a digital to analog converter for purposes of sounding alarms and activating corrective systems.

* * * * *